United States Patent
Fletcher

(10) Patent No.: US 8,175,759 B2
(45) Date of Patent: May 8, 2012

(54) SYSTEMS AND METHODS FOR VALIDATING PREDETERMINED EVENTS IN RECONFIGURABLE CONTROL SYSTEMS

(75) Inventor: Mitch Fletcher, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 424 days.

(21) Appl. No.: 12/489,061

(22) Filed: Jun. 22, 2009

(65) Prior Publication Data

US 2010/0324756 A1 Dec. 23, 2010

(51) Int. Cl.
*G01C 23/00* (2006.01)

(52) U.S. Cl. ............ 701/3; 701/29.7; 701/34.4; 701/36; 714/11

(58) Field of Classification Search .......... 701/3, 4, 701/33, 34, 36, 29.7, 30.6, 34.4; 714/11, 714/12, 55
See application file for complete search history.

(56) References Cited

U.S. PATENT DOCUMENTS

| | | | |
|---|---|---|---|
| 5,339,782 A * | 8/1994 | Golzer et al. ............ 123/399 |
| 6,047,122 A | 4/2000 | Spiller | |
| 6,223,208 B1 | 4/2001 | Kiefer et al. | |
| 6,385,637 B1 | 5/2002 | Peters et al. | |
| 6,496,925 B1 * | 12/2002 | Rodgers et al. ............ 712/244 |
| 6,598,122 B2 | 7/2003 | Mukherjee et al. | |
| 6,785,887 B2 | 8/2004 | Armstrong et al. | |
| 6,820,263 B1 | 11/2004 | Klappholz | |
| 6,857,064 B2 | 2/2005 | Smith et al. | |
| 6,874,080 B2 | 3/2005 | Wishneusky | |
| 7,117,390 B1 * | 10/2006 | Klarer et al. ............ 714/13 |
| 7,170,511 B2 | 1/2007 | Sowizral et al. | |
| 7,392,525 B2 | 6/2008 | Alverson et al. | |
| 7,406,688 B2 | 7/2008 | Shibayama et al. | |
| 7,454,600 B2 | 11/2008 | Burns et al. | |
| 7,877,627 B1 * | 1/2011 | Freydel ............ 714/11 |
| 2001/0037448 A1 | 11/2001 | Mukherjee et al. | |
| 2003/0158885 A1 | 8/2003 | Sager | |
| 2006/0085554 A1 | 4/2006 | Shah et al. | |

* cited by examiner

*Primary Examiner* — Gertrude Arthur Jeanglaude
(74) *Attorney, Agent, or Firm* — Ingrassia Fisher & Lorenz, P.C.

(57) ABSTRACT

Systems and methods for validating predetermined events in reconfigurable control systems are provided. One method includes receiving, by a plurality of redundant processors operating in a first mode, a notice from two of three redundant sensors that the predetermined event occurred and reconfiguring the plurality of redundant processors to operate in a second mode in response to the notice. Another method includes receiving a first notice that one or more sensors detected that a first vehicle is coupled to a second vehicle at a primary control system and a secondary control system and reconfiguring the primary control system and the secondary control system to operate in another mode at substantially the same time in response to the notice.

19 Claims, 4 Drawing Sheets

SYSTEMS AND METHODS FOR VALIDATING PREDETERMINED EVENTS IN RECONFIGURABLE CONTROL SYSTEMS

FIELD OF THE INVENTION

The present invention generally relates to the field of computer platform control systems used in, for example, spacecraft, aircraft, motor vehicle, and the like, and more specifically to systems and methods for validating predetermined events in reconfigurable control systems.

BACKGROUND OF THE INVENTION

Aircraft and space vehicle control systems are responsible for controlling various systems in an aircraft, such as "fly by wire" guidance and navigation systems, aircraft lighting systems, aircraft environmental control systems, aircraft flight control systems, and aircraft flight management systems. Over time, different types of vehicle control systems have been proposed to provide control functionality while minimizing size, weight, and cost.

One type of control system is disclosed in U.S. Pat. No. 7,421,526 entitled RECONFIGURABLE VIRTUAL BACKPLANE ARCHITECTURE issued to Fletcher et al., the contents of which are incorporated herein. This control system utilizes a reconfigurable virtual backplane system comprising a communication bus and at least two line cards. Each of the line cards are coupled to the communication bus and comprise a processor and a separate configuration memory coupled to the processor. The configuration memory comprises an array of configuration tables, wherein each configuration table stores a listing of processes to run and data to be transmitted to or received by the processor from the communication bus. A current configuration table is selected from the array of configuration tables upon the occurrence of a predetermined event such that the control system is able to dynamically reconfigure itself upon the occurrence of various predetermined events (e.g., two spacecraft docking with one another).

Another control system is disclosed in co-pending U.S. patent application Ser. No. 12/473,837 entitled RECONFIGURABLE VIRTUAL BACKPLANE SYSTEMS AND METHODS filed by Nigoghosian et al., the contents of which are incorporated herein. This control system utilizes a communication bus and first and second line cards coupled to the communication bus. The first line card includes a first processor comprising a first system memory storing a first array of configuration tables. Each configuration table in the first array stores a listing of processes to be transmitted to or received from the communication bus, wherein a first configuration table is selected from the first array during a first configuration (e.g., an undocked spacecraft). The second line card includes a second processor comprising a second system memory storing a second array of configuration tables. Each configuration table in the second array stores a listing of processes to be transmitted to or received from the communication bus, wherein a second configuration table is selected from the second array of configuration tables during a second configuration (e.g., the spacecraft docked with another spacecraft).

Prior to reconfiguring the control systems in a spacecraft, an aircraft, a motor vehicle, or the like, it is important to ensure that the predetermined event(s) and/or the change in configuration have occurred. Accordingly, it is desirable to provide systems and methods for validating predetermined events and/or configurations in reconfigurable control systems. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Various embodiments provide methods for validating the occurrence of a predetermined event in a plurality of redundant processors operating in a first mode coupled to three redundant sensors. One method comprises the steps of receiving, by the plurality of redundant processors, a notice from two of the three redundant sensors that the predetermined event occurred and reconfiguring the plurality of redundant processors to operate in a second mode in response to the notice.

Other embodiments provide methods for validating that a first vehicle operating in a first mode is coupled to a second vehicle operating in a second mode, the first vehicle comprising a primary control system, a secondary control system for the control system, and a sensor coupled to the primary control system and the secondary control system. One method comprises the steps of receiving a notice that the sensor detected that the first vehicle is coupled to the second vehicle at the primary control system and the secondary control system, and reconfiguring the primary control system and the secondary control system to operate in a different mode at substantially the same time in response to the notice.

Methods for validating that a first vehicle operating in a first mode is coupled to a second vehicle operating in a second mode, the first vehicle comprising a primary control system, a secondary control system for the primary control system, a first sensor, a second sensor, and a third sensor coupled to the primary control system and the secondary control system are also provided. One method comprises the steps of receiving a notice that at least two of the first sensor, the second sensor, and the third sensor detected that the first vehicle is coupled to the second vehicle at the primary control system and the secondary control system, and reconfiguring the primary control system and the secondary control system to operate in a different mode at substantially the same time in response to the notice.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
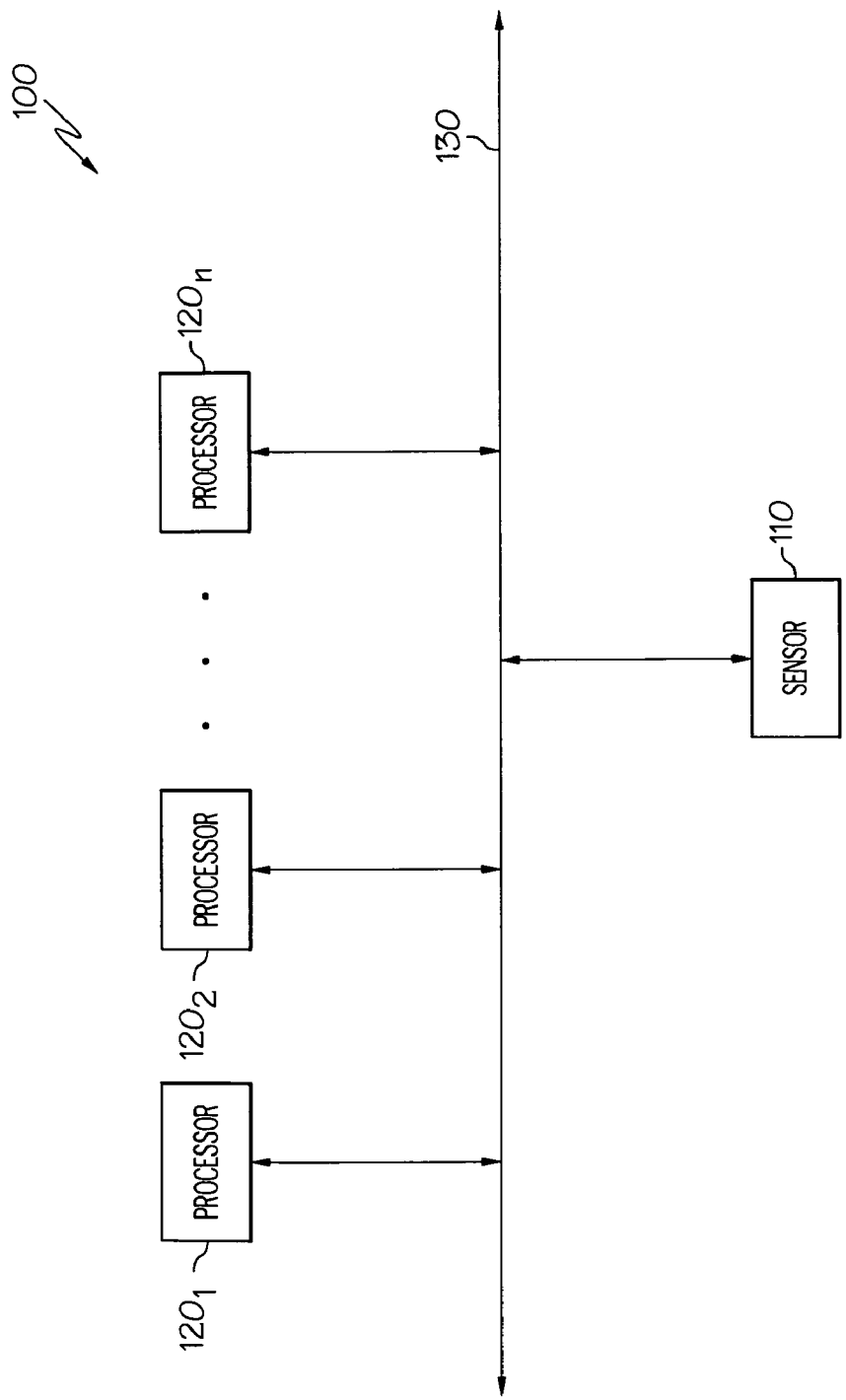
FIG. 1 is a block diagram of one embodiment of a control system comprising a system for validating the occurrence of a predetermined event.

FIG. 1 is a block diagram of one embodiment of a control system 100 comprising a system for validating the occurrence of a predetermined event and/or change in configuration. In various embodiments, control system 100 may be implemented on a spacecraft, an aircraft, a motor vehicle, or other similar vehicle. At least in the illustrated embodiment, control system 100 comprises a sensor 110 and a plurality of processors $120_1$-$120_n$ coupled to sensor 110 via a bus 130 (e.g., a wired and/or wireless bus).

Sensor 110 may be any sensor known in the art or developed in the future capable of detecting a predetermined event and/or change in configuration in the spacecraft, aircraft, motor vehicle, or other similar vehicle. For example, sensor 110 may be a clock, a contact sensor, and/or any other type of sensor capable of detecting a predetermined event and/or change in configuration, and communicating detection of the occurrence of such event and/or configuration change to processors $120_1$-$120_n$.

Processors $120_1$-$120_n$, in one embodiment, are redundant processors configured to control one or more systems on the spacecraft, aircraft, motor vehicle, or other similar vehicle. For example, a first processor $120_1$ may be the primary processor, while a secondary processor $120_2$ may be utilized to back up processor $120_1$, another secondary processor $120_3$ may be utilized to back up secondary processor $120_2$, and so forth depending on the desired level of redundancy.

In another embodiment, control system 100 may include multiple types of primary processors $120_1$, each primary processor $120_1$ being configured to control one or more different systems on the spacecraft, aircraft, motor vehicle, or other similar vehicle and including secondary processors $120_2$ and/or $120_3$. For example, a first primary processor $120_1$ may be configured to control the navigation system, a second primary processor $120_1$ may be configured to control a ventilation system, a third primary processor $120_1$ may be an autopilot system, and so forth up to and including N number of primary processors $120_1$ (and respective secondary processors $120_2$ and/or $120_3$) configured to perform a particular function on the spacecraft, aircraft, motor vehicle, or other similar vehicle.

Processors $120_1$-$120_n$, in one embodiment, are configured to receive notice from sensor 110 at substantially the same time that the predetermined event occurred and/or that there has been a change in configuration. Furthermore, processors $120_1$-$120_n$ are configured to communicate with one another (via bus 130) that they each received the notice from sensor 110. Processors $120_1$-$120_n$ are further configured to determine the number of processors $120_1$-$120_n$ that acknowledged receiving such notice. Moreover, processors $120_1$-$120_n$ are configured to determine if a majority of processors $120_1$-$120_n$ acknowledged receipt of such notice.

In one embodiment, if a majority of processors $120_1$-$120_n$ acknowledged receipt of the notice from sensor 110, processors $120_1$-$120_n$ are capable of reconfiguring themselves to perform at least one different function. In one embodiment, processors $120_1$-$120_n$ are capable of reconfiguring themselves within one cycle of acknowledging receipt of the notice from sensor 110, and at substantially the same time. If a majority of processors $120_1$-$120_n$ do not acknowledge receipt of the notice from sensor 110, processors $120_1$-$120_n$ do not reconfigure themselves.

In a further embodiment, processors $120_1$-$120_n$ are configured to receive a second notice (at substantially the same time) from sensor 110 that a second predetermined event occurred. Here, processors $120_1$-$120_n$ are configured to communicate with one another (via bus 130) that they each received the second notice from sensor 110. Processors $120_1$-$120_n$ then again determine the number of processors $120_1$-$120_n$ that acknowledged receiving the second notice to determine if a majority of processors $120_1$-$120_n$ acknowledged receipt of the second notice.

If a majority of processors $120_1$-$120_n$ acknowledged receipt of the second notice, processors $120_1$-$120_n$ reconfigure themselves to cease performing the different function(s). In one embodiment, processors $120_1$-$120_n$ reconfigure themselves within one cycle of acknowledging receipt of the second notice from sensor 110, and at substantially the same time. If a majority of processors $120_1$-$120_n$ do not acknowledge receipt of the second notice from sensor 110, processors $120_1$-$120_n$ continue performing the different function(s).

While FIG. 1 illustrates control system 100 comprising a single sensor 110, the invention is not limited to such a configuration. That is, other embodiments may use a plurality of sensors to detect the occurrence of the predetermined event and/or change in configuration.

Figure 2:
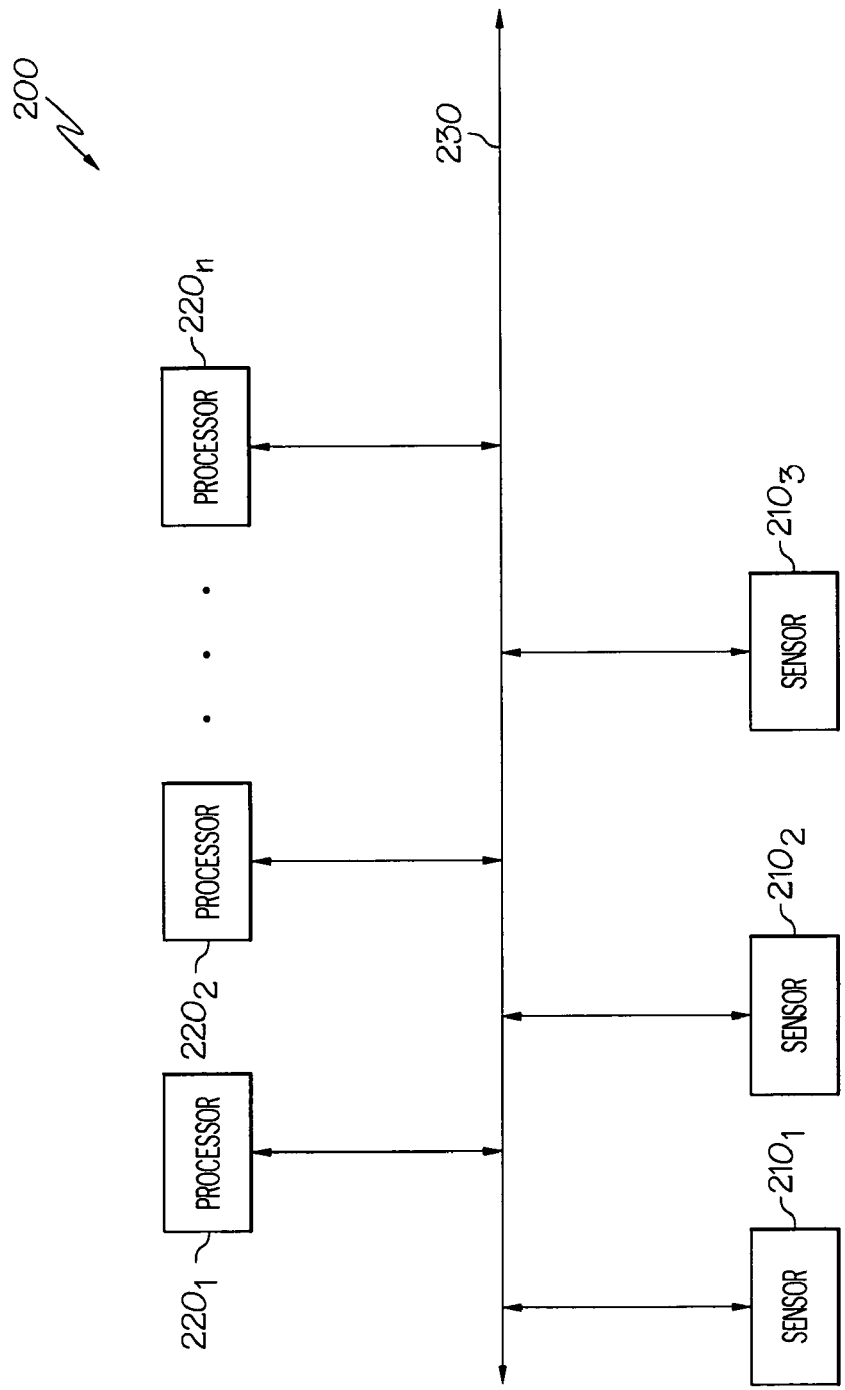
FIG. 2 is a block diagram of another embodiment of a control system comprising a system for validating the occurrence of a predetermined event.

FIG. 2 is a block diagram of one embodiment of a control system 200 comprising a system for validating the occurrence of a predetermined event. In various embodiments, control system 200 may be implemented on a spacecraft, an aircraft, a motor vehicle, or other similar vehicle. At least in the illustrated embodiment, control system 200 comprises three sensors $210_1$-$210_3$ and a plurality of processors $220_1$-$220_n$ coupled to sensors $210_1$-$210_3$ via a bus 230 (e.g., a wired and/or wireless bus).

Sensors $210_1$-$210_3$ may each be any sensor known in the art or developed in the future capable of detecting a predetermined event and/or change in configuration in the spacecraft, aircraft, motor vehicle, or other similar vehicle. In one embodiment, sensors $210_1$-$210_3$ are the same type of sensor. For example, sensors $210_1$-$210_3$ may each be a clock, a contact sensor, a device configured to detect an action performed by a human (e.g., the actuation of a button, switch, lever, etc.), and/or any other type of sensor capable of detecting a predetermined event and/or change in configuration. In another embodiment, at least two of sensors $210_1$-$210_3$ are different types of sensors. For example, a sensor $210_1$ may be a clock and sensor $210_2$ and $210_3$ may be contact sensors; or a sensor $210_1$ may be a clock, a sensor $210_2$ may be a contact sensor, and a sensor $210_3$ may be configured to detect an action performed by a human. In both embodiments, sensors $210_1$-$210_3$ are configured to communicate detection of the occurrence of such event and/or configuration change to processors $220_1$-$220_n$.

Each processor 220 is configured to control one or more systems on the spacecraft, aircraft, motor vehicle, or other similar vehicle. For example, a processor $220_1$ may be configured to control the navigation system, a processor $220_2$ may be configured to control a ventilation system, a processor $220_3$ may be configured to monitor a fuel system, a processor $220_4$ configured to function as an autopilot, etc. up to and including a processor $220_n$ configured to perform particular functions on the spacecraft, aircraft, motor vehicle, or other similar vehicle.

Furthermore, one or more of processors $220_1$-$220_n$ may include one or more redundant or backup processors configured to perform the function(s) of their respective primary processors in the unlikely event of a processor malfunction. In one embodiment, one or more of processors $220_1$-$220_n$ includes a single backup processor. In another embodiment, one or more of processors $220_1$-$220_n$ includes two or more backup processors.

Processors $220_1$-$220_n$, in one embodiment, are configured to receive notice from sensors $210_1$-$210_3$, at substantially the same time, that the predetermined event occurred and/or that the change in configuration occurred for which each sensor 210 is responsible for detecting. Processors $220_1$-$220_n$ are further configured to determine if a majority of sensors $210_1$-$210_3$ have detected and transmitted notice that the predetermined event occurred and/or that the change in configuration has occurred.

Processors $220_1$-$220_n$ are further configured to communicate with one another (via bus 230) that they each received a notice from a majority of sensors $210_1$-$210_3$. In addition, processors $220_1$-$220_n$ are configured to determine the number of processors $220_1$-$220_n$ that acknowledged receiving such notice. Moreover, processors $220_1$-$220_n$ are configured to determine if a majority of processors $220_1$-$220_n$ acknowledged receipt of notice from the majority of sensors $210_1$-$210_3$.

In one embodiment, if a majority of processors $220_1$-$220_n$ acknowledged receipt of the notice from a majority of sensors $210_1$-$210_3$, processors $220_1$-$220_n$ are configured to reconfigure themselves to perform at least one different function. In one embodiment, processors $220_1$-$220_n$ are capable of reconfiguring themselves within one cycle of acknowledging receipt of the notice from a majority of sensors $210_1$-$210_3$, and at substantially the same time. If a majority of processors $220_1$-$220_n$ do not acknowledge receipt of the notice from a majority of sensors $210_1'$-$210_3$, processors $220_1$-$220_n$ do not reconfigure themselves.

In a further embodiment, processors $220_1$-$220_n$ are configured to receive a second notice (at substantially the same time) from sensors $210_1$-$210_3$ that a second predetermined event occurred. Here, processors $220_1$-$220_n$ are configured to communicate with one another (via bus 230) that they each received the second notice from a majority of sensors $210_1$-$210_3$. Processors $220_1$-$220_n$ then again determine the number of processors $220_1$-$220_n$ that acknowledged receiving the second notice from a majority of sensors $210_1$-$210_3$ and determine if a majority of processors $220_1$-$220_n$ acknowledged receipt of the second notice.

If a majority of processors $220_1$-$220_n$ acknowledged receipt of the second notice from a majority of sensors $210_1$-$210_3$, processors $220_1$-$220_n$ reconfigure themselves to cease performing the different function(s). In one embodiment, processors $220_1$-$220_n$ reconfigure themselves within one cycle of acknowledging receipt of the second notice from a majority of sensors $210_1$-$210_3$, and at substantially the same time. If a majority of processors $220_1$-$220_n$ do not acknowledge receipt of the second notice from a majority of sensors $210_1$-$210_3$, processors $220_1$-$220_n$ continue performing the different function(s).

Figure 3:
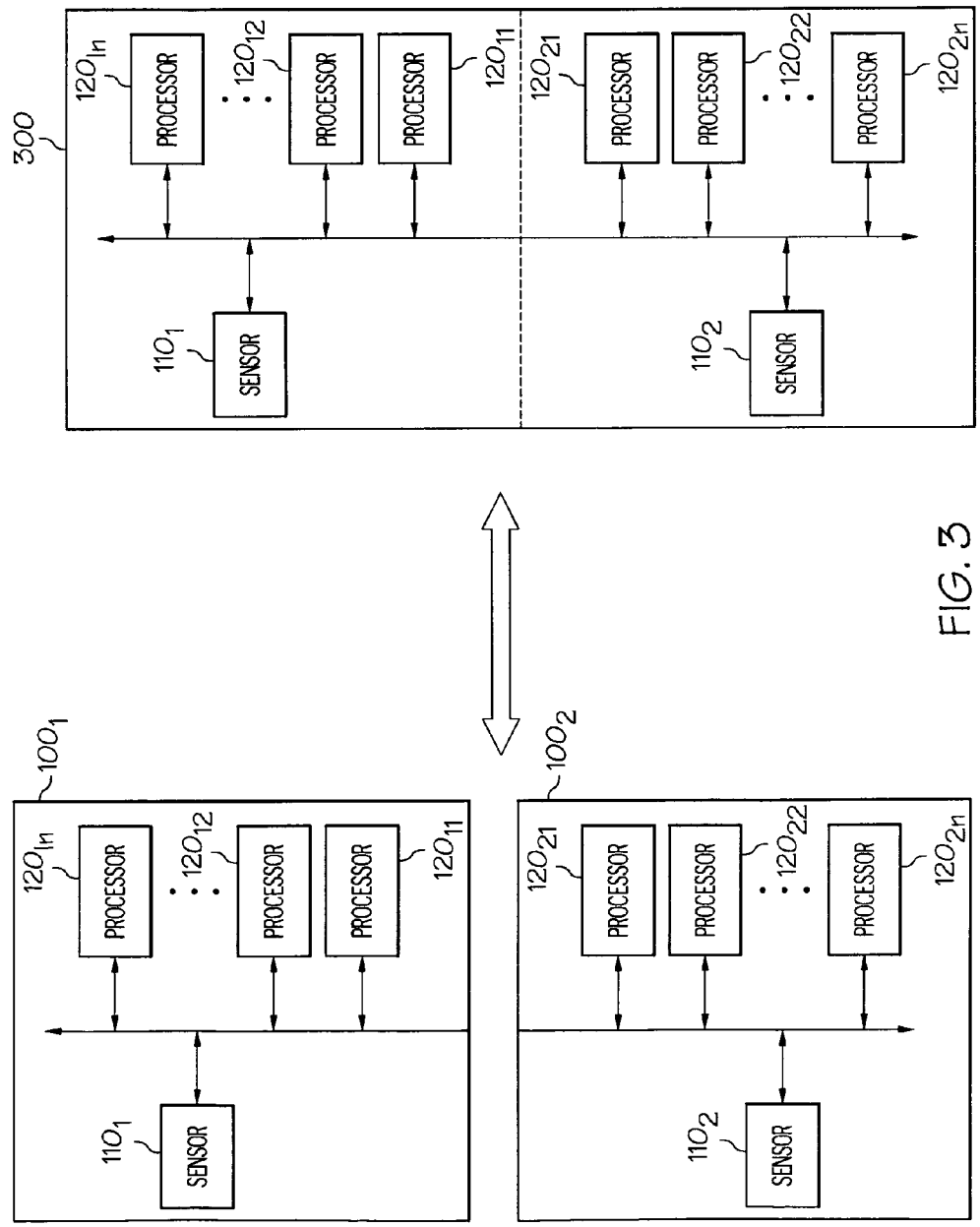
FIG. 3 is a block diagram illustrating embodiments of predetermined events and/or change in configurations for two control systems similar to the embodiment illustrated in FIG. 1.

FIG. 3 is a block diagram illustrating embodiments of predetermined events and/or change in configurations for two control systems $100_1$ and $100_2$, which are each similar to control system 100 discussed above with reference to FIG. 1. In one embodiment, a first predetermined event and/or change in configuration is combining control systems $100_1$ and $100_2$ to form a single control system 300, which is capable of being detected by sensors $110_1$ and $110_2$ and transmitted to processors $120_{11}$-$120_{1n}$ and $120_{21}$-$120_{2n}$, respectively. In another embodiment (e.g., where sensors $110_1$ and $110_2$ are clocks), a first predetermined event may be the elapse of a predetermined amount of time from a particular point in time (e.g., a time of launch, take-off, etc.).

In this embodiment, processors $120_{11}$-$120_{1n}$ and $120_{21}$-$120_{2n}$, form a single system after control system 300 is formed. That is, processors $120_{11}$-$120_{1n}$ and $120_{21}$-$120_{2n}$ each reconfigure themselves (at substantially the same time) to communicate with one another and to perform at least one additional feature after processors $120_{11}$-$120_{1n}$ and $120_{21}$-$120_{2n}$ receive notice of the first predetermined event and/or change in configuration. For example, processors $120_{11}$ and $120_{21}$ may each be responsible for navigating their respective crafts; however, once the crafts are combined, processor $120_{11}$ (and secondary processors $120_{12}$-$120_{1n}$) may reconfigure itself to navigate the combined craft, while processor $120_{21}$ (and secondary processors $120_{22}$-$120_{2n}$) may be disconnected, configured to perform a new function, or reconfigure itself to be a backup for processor $120_{11}$.

In another embodiment, a second predetermined event and/or change in configuration is the separation of control systems $100_1$ and $100_2$ from control system 300, which is capable of being detected by sensors $110_1$ and $110_2$ and transmitted to processors $120_{11}$-$120_{1n}$ and $120_{21}$-$120_{2n}$, respectively. In another embodiment (e.g., where sensors $110_1$ and $110_2$ are clocks), the second predetermined event may be the elapse of a predetermined amount of time from a particular point in time (e.g., a time of launch, take-off, combining of control systems $110_1$ and $110_2$, etc.). In this embodiment, once separation has occurred, processors $120_{11}$-$120_{1n}$ and $120_{21}$-$120_{2n}$ again reconfigure themselves (at substantially the same time) to return to their respective pre-combination functions.

Figure 4:
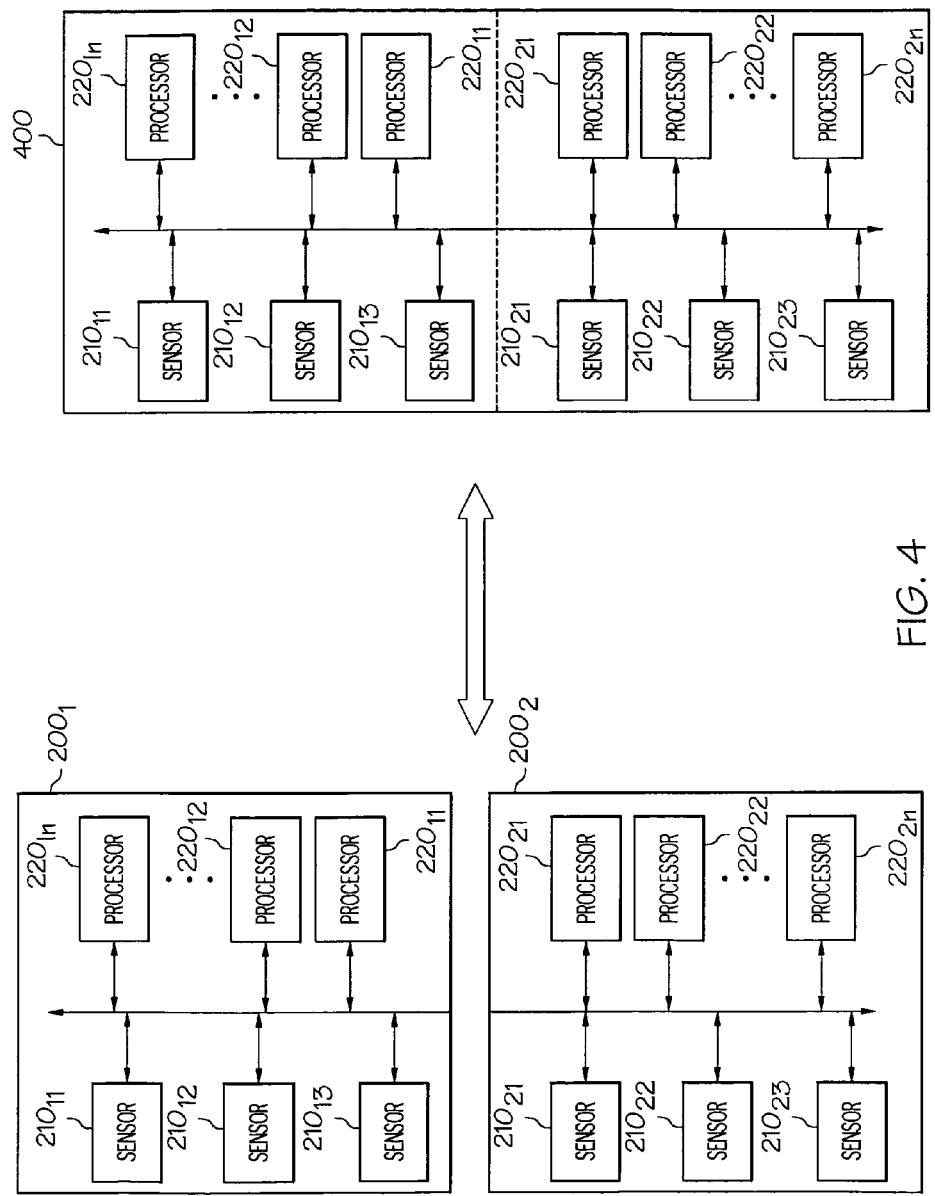
FIG. 4 is a block diagram illustrating embodiments of predetermined events and/or change in configurations for two control systems similar to the embodiment illustrated in FIG. 2.

FIG. 4 is a block diagram illustrating embodiments of predetermined events and/or change in configurations for two control systems $200_1$ and $200_2$, which are each similar to control system 200 discussed above with reference to FIG. 2. In one embodiment, a first predetermined event and/or change in configuration is combining control systems $200_1$ and $200_2$ to form a single control system 400, which is capable of being detected by sensors $210_{11}$-$210_{13}$ and $210_{21}$-$210_{23}$ and transmitted to processors $220_{11}$-$220_{1n}$ and $220_{21}$-$220_{2n}$, respectively. In another embodiment (e.g., where sensors $210_{11}$-$210_{13}$ and $210_{21}$-$210_{23}$ are clocks), the first predetermined event may be the elapse of a predetermined amount of time from a particular point in time (e.g., a time of launch, take-off, etc.).

In this embodiment, processors $220_{11}$-$220_{1n}$ and $220_{21}$-$220_{2n}$ form a single system after control system 400 is formed. That is, processors $220_{11}$-$220_{1n}$ and $220_{21}$-$220_{2n}$ each reconfigure themselves (at substantially the same time) to communicate with one another and to perform at least one additional feature after processors $220_{11}$-$220_{1n}$ and $220_{21}$-$220_{2n}$ receive notice of the predetermined event and/or change in configuration. For example, processors $120_{11}$ and $220_{21}$ may each be responsible for navigating their respective crafts; however, once the crafts are combined, processor $220_{11}$ (and secondary processors $220_{12}$-$220_{1n}$) may reconfigure itself to navigate the combined craft, while processor $220_{21}$ (and secondary processors $220_{22}$-$220_{2n}$) may be disconnected, configured to perform a new function, or reconfigure itself to be a backup for processor $220_{11}$.

In another embodiment, a second predetermined event and/or change in configuration is the separation of control systems $200_1$ and $200_2$ from control system 300, which is capable of being detected by sensors $210_{11}$-$210_{13}$ and $210_{21}$-$210_{23}$, and transmitted to processors $220_{11}$-$220_{1n}$ and $220_{21}$-$220_{2n}$, respectively. In another embodiment (e.g., where sensors $210_{11}$-$210_{13}$ and $210_{21}$-$210_{23}$ are clocks), the second predetermined event may be the elapse of a predetermined amount of time from a particular point in time (e.g., a time of launch, take-off, combining of control systems $210_1$ and $210_2$, etc.).

In this embodiment, once separation has occurred, processors $220_{1_1}$-$220_{1_n}$ and $220_{2_1}$-$220_{2_n}$ again reconfigure themselves (at substantially the same time) to return to their respective pre-combination functions.

In yet another exemplary embodiment, sensors $210_{1_1}$-$210_{1_3}$ and $210_{2_1}$-$210_{2_3}$ may be different types of sensors. For example, sensors $210_{1_1}$ and $210_{2_1}$ may be clocks, sensors $210_{1_2}$ and $210_{2_2}$ may be contact sensors, and sensors $210_{1_3}$ and $210_{2_3}$ may be configured to detect a human action (e.g., actuation of a button, switch, lever, etc.). In this embodiment, processors $220_{1_1}$-$220_{1_n}$ reconfigure themselves after a majority of processors $220_{1_1}$-$220_{1_n}$ indicate that they received notice of the detection of the predetermined event and/or change in configuration from a majority of sensors $210_{1_1}$-$210_{1_3}$. Likewise, processors $220_{2_1}$-$220_{2_n}$ reconfigure themselves after a majority of processors $220_{2_1}$-$220_{2_n}$ indicate that they received notice of the detection of the predetermined event and/or change in configuration from a majority of sensors $210_{2_1}$-$210_{2_3}$. For example, if control systems $200_1$ and $200_2$ are scheduled to combine at a predetermined time after launch, for a majority of respective sensors $210_{1_1}$-$210_{1_3}$ and $210_{2_1}$-$210_{2_3}$ to detect the combining of control systems $200_1$ and $200_2$ (i.e., the predetermined event and/or change in configuration), at least two of the following conditions must be detected: sensors $210_{1_1}$ and $210_{2_1}$ detect that the predetermined amount of time has lapsed, sensors $210_{1_2}$ and $210_{2_2}$ detect contact between control systems $200_1$ and $200_2$, and sensors $210_{1_3}$ and $210_{2_3}$ detect that a human has actuated a switch, button, lever, etc. confirming that control systems $200_1$ and $200_2$ have combined. Furthermore, for processors $220_{1_1}$-$220_{1_n}$ and $220_{2_1}$-$220_{2_n}$ to reconfigure themselves, a majority of processors $220_{1_1}$-$220_{1_n}$ and $220_{2_1}$-$220_{2_n}$ need to confirm that they received notice from a majority of their respective sensors $220$.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for validating an occurrence of a predetermined event in a plurality of redundant processors operating in a first mode, each of the plurality coupled to each of the three redundant sensors, the method comprising the steps of:
receiving, by the plurality of redundant processors, a notice from two of the three redundant sensors that the predetermined event occurred; and
reconfiguring the plurality of redundant processors to operate in a second mode in response to the notice.

2. The method of claim 1, wherein the notice is received by the plurality of redundant processors at substantially a same time.

3. The method of claim 1, wherein the reconfiguring step further comprises the step of reconfiguring each redundant processor at substantially a same time.

4. The method of claim 3, further comprising the steps of:
communicating, by a first redundant processor, to a second redundant processor receipt of the notice prior to reconfiguring; and
communicating, by the second redundant processor, to the first redundant processor receipt of the notice prior to reconfiguring.

5. The method of claim 1, wherein the reconfiguring step comprises the step of reconfiguring each redundant processor within one clock cycle of receiving the notice.

6. The method of claim 5, wherein the reconfiguring step further comprises the step of reconfiguring each redundant processor at substantially a same time.

7. The method of claim 6, further comprising the steps of:
communicating, by a first redundant processor, to a second redundant processor receipt of the notice prior to reconfiguring; and
communicating, by the second redundant processor, to the first redundant processor receipt of the notice prior to reconfiguring.

8. The method of claim 1, further comprising the step of determining, by the two of the three redundant sensors, that the predetermined event occurred, wherein the predetermined event is an elapse of a predetermined amount of time.

9. The method of claim 1, further comprising the steps of:
detecting, by one of the two redundant sensors, that the predetermined event occurred; and
detecting, by another one of the two redundant sensors, user confirmation that the predetermined event occurred.

10. A method for validating that a first vehicle operating in a first mode is coupled to a second vehicle operating in a second mode, the first vehicle comprising a first primary control system, a first secondary control system for the first primary control system, and a first sensor coupled to the first primary control system and the first of secondary control system, the method comprising the steps of:
receiving, at the first primary control system and the first secondary control system, a first notice that the first sensor detected that the first vehicle is coupled to the second vehicle; and
reconfiguring the first primary control system and the first secondary control system to operate in a third mode at substantially the same time in response to the first notice.

11. The method of claim 10, wherein the first primary control system and the first secondary control system are each reconfigured within one clock cycle of receiving the first notice.

12. The method of claim 10, wherein the second vehicle comprises a second primary control system, a second secondary control system for the second primary control system, and a second sensor coupled to the second primary control system and the second secondary control system, the method further comprising the steps of:
receiving, at the second primary control system and the second secondary control system, a second notice that the second sensor detected that the second vehicle is coupled to the first vehicle; and
reconfiguring the second primary control system and the second secondary control system to operate in the third mode at substantially the same time in response to the second notice.

13. The method of claim 12, wherein:
the first primary control system and the first secondary control system are each reconfigured within one clock cycle of receiving the first notice; and the second primary control system and the second secondary control system are each reconfigured within one clock cycle of receiving the second notice.

14. The method of claim 10, wherein the first vehicle and the second vehicle are spacecraft.

15. A method for validating that a first vehicle operating in a first mode is coupled to a second vehicle operating in a second mode, the first vehicle comprising a first primary control system, a first secondary control system for the first primary control system, and a first sensor, a second sensor, and a third sensor coupled to the first primary control system and the first secondary control system, the method comprising the steps of:

receiving, at the first primary control system and the first secondary control system, a first notice that at least two of the first sensor, the second sensor, and the third sensor detected that the first vehicle is coupled to the second vehicle; and reconfiguring the first primary control system and the first secondary control system to operate in a third mode at substantially the same time in response to the first notice.

16. The method of claim 15, wherein the first primary control system and the first secondary control system are each reconfigured within one clock cycle of receiving the first notice.

17. The method of claim 15, wherein the second vehicle comprises a second primary control system, a second secondary control system for the second primary control system, and a fourth sensor, a fifth sensor, and a sixth sensor coupled to the second primary control system and the second secondary control system, the method further comprising the steps of:

receiving, at the second primary control system and the second secondary control system, a second notice that at least two of the fourth sensor, the fifth sensor, and the sixth sensor detected that the second vehicle is coupled to the first vehicle; and reconfiguring the second primary control system and the second secondary control system to operate in the third mode at substantially the same time in response to the second notice.

18. The method of claim 17, wherein:

the first primary control system and the first secondary control system are each reconfigured within one clock cycle of receiving the first notice; and the second primary control system and the second secondary control system are each reconfigured within one clock cycle of receiving the second notice.

19. The method of claim 15, wherein the first vehicle and the second vehicle are spacecraft.

\* \* \* \* \*